US006169543B1

(12) United States Patent
Wehmeyer

(10) Patent No.: US 6,169,543 B1
(45) Date of Patent: Jan. 2, 2001

(54) SYSTEM AND METHOD FOR CUSTOMIZING PROGRAM GUIDE INFORMATION TO INCLUDE REMINDER ITEM OR LOCAL IDENTIFIER

(75) Inventor: Keith Reynolds Wehmeyer, Hamilton, IN (US)

(73) Assignee: Thomson Licensing S.A., Boulogne (FR)

( * ) Notice: Under 35 U.S.C. 154(b), the term of this patent shall be extended for 0 days.

(21) Appl. No.: 09/221,412

(22) Filed: Dec. 28, 1998

(51) Int. Cl.$^7$ .......................................... H04N 7/16
(52) U.S. Cl. ........................... 345/327; 348/906; 348/564
(58) Field of Search ................................... 348/906, 6, 10, 348/12, 13, 563, 564, 558; 345/327; 455/6.2, 6.3, 6.1, 5.1, 4.1, 4.2; H04N 7/16, 7/173

(56) References Cited

U.S. PATENT DOCUMENTS

| 5,233,423 | * | 8/1993 | Jernigan et al. ...................... 358/181 |
| 5,621,458 | * | 4/1997 | Mann et al. .......................... 348/232 |
| 5,699,107 | | 12/1997 | Lawler et al. ......................... 348/13 |
| 5,805,235 | | 9/1998 | Bedard . | |
| 5,887,062 | * | 3/1999 | Maeda et al. .......................... 380/20 |
| 5,977,964 | * | 11/1999 | Williams et al. ...................... 345/327 |
| 6,002,394 | * | 12/1999 | Schein et al. ......................... 345/327 |

FOREIGN PATENT DOCUMENTS

| 0570593A2 | 9/1993 | (JP) | ............................... H04N/5/445 |
| 0843468A2 | 11/1997 | (JP) | ............................... H04N/5/775 |
| 97/13368 | 10/1996 | (WO) | ............................... H04N/7/10 |

* cited by examiner

Primary Examiner—Chris Grant
(74) Attorney, Agent, or Firm—Joseph S. Tripoli; Robert D. Shedd; Frank Y. Liao

(57) ABSTRACT

An interface and a method for customizing program guide information containing program descriptions is provided. The program guide information is downloaded and stored in a memory, preferably in a generic manner. A menu is generated based on the program guide information. The menu includes program identifiers which can be selected by a user to implement the corresponding programs. The menu then can be customized to include identifier(s) indicative of one or more additional programs or item, including user-specific programs and items which are remotely accessed or locally accessed. After customization, the additional identifiers are selectable by the user to implement the corresponding programs or display the corresponding items. Preferably, the customization is performed locally and interactively using displays generated by an electronic host device or another device connected thereto.

22 Claims, 8 Drawing Sheets

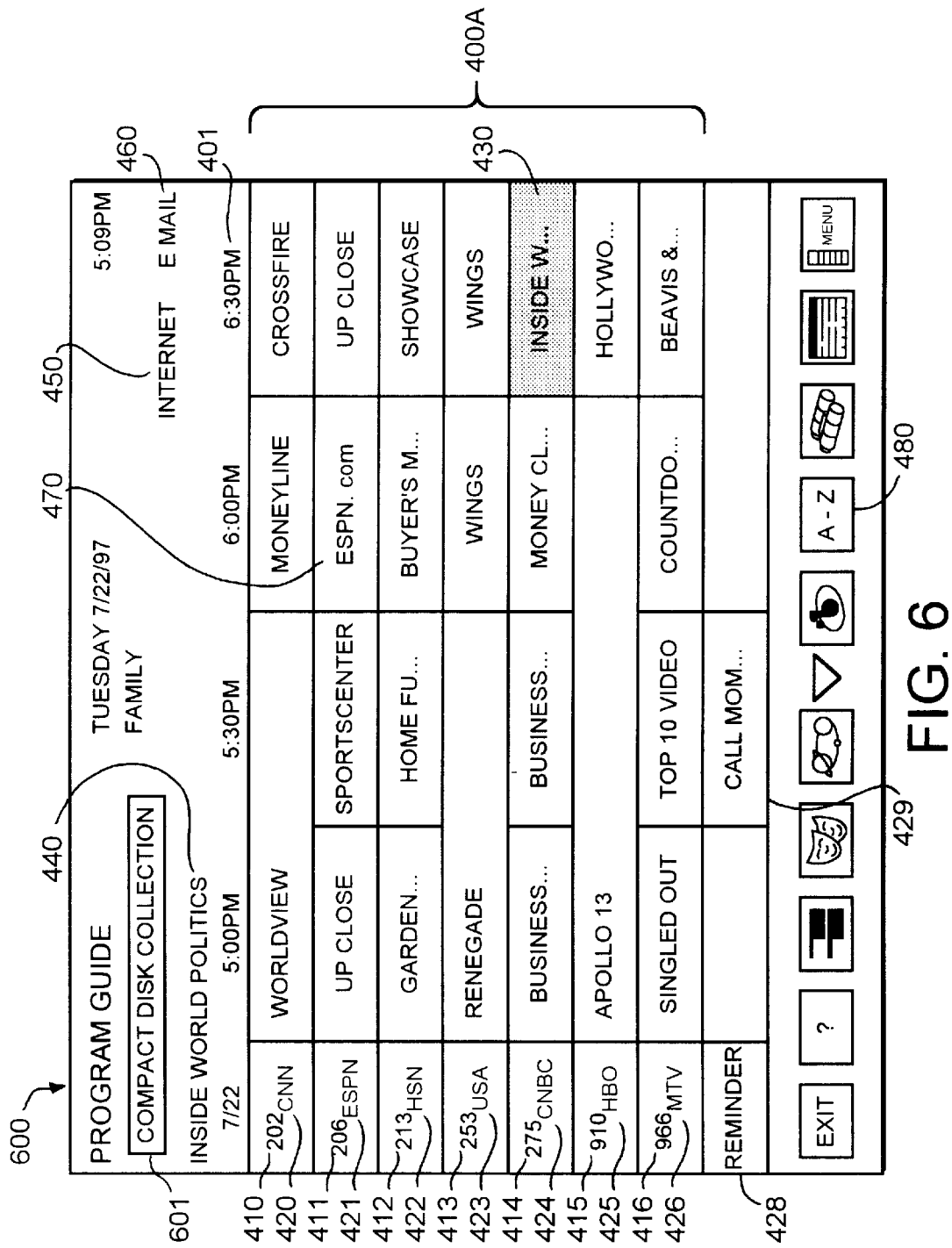

SYSTEM AND METHOD FOR CUSTOMIZING PROGRAM GUIDE INFORMATION TO INCLUDE REMINDER ITEM OR LOCAL IDENTIFIER

FIELD OF INVENTION

This invention generally relates to the field of program guide information processing and more particularly, to a system and method of customizing program guide information.

BACKGROUND OF INVENTION

Electronic devices such as televisions and personal computers (PC) require a control system that includes a user interface system. Typically, a user interface provides information to a user and simplifies use of the device. One example of a user interface is an Electronic Program Guide (EPG) in a television system.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis.

Unlike non-interactive guides that reside on a dedicated channel and merely scroll through the current programming on the other channels for the next 2 to 3 hours, EPGs allow viewers to select any channel at any time during some period into the future, e.g., up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device. Such EPGs are known in the art and described, for instance, in US Pat. Nos. 5,353,121; 5,479,268; and 5,479,266 issued to Young et al. and assigned to StarSight Telecast, Inc.

In addition, U.S. Pat. No. 5,515,106, issued to Chaney et al., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., title, rating, star, etc.) relating to a program may be transmitted from a program guide database provider to a receiving apparatus efficiently.

User interfaces such as EPGs are applicable to analog and digital television systems and to other electronic devices such as personal computers. As electronic devices become increasingly complex with a multitude of features, the need for a robust and easy-to-use user interface becomes ever more important. For example, separate electronic systems having respective interfaces for controlling features of each system are now being combined into a single system requiring a single user interface. One specific example is the so-called PCTV which includes features of both a personal computer and a television. The user interface system for such a device must provide both clear communication of computer and television related information and provide for simple control of both computer and television related features.

One problem with the current EPG system is that the program guide is typically provided in a fixed format (i.e., in a two-dimensional grid format with time information on one axis and channel information on the other axis, as described above). The users typically are not provided with ways to customize the program guide list or to categorize the program guide information.

Another problem with current EPG systems is that the content of the program guide typically is modified only on a generic level for all subscribers to the EPG system. There typically is no way to customize the program guide list to include user-selectable program identifiers corresponding to the user's own programs from a local source (e.g., audio presentations from the user's compact disk collection and/or audiovisual presentations from the user's video tape collection, DVD collection, video disk collection, and/or camcorder), nor is there typically a way to customize the program guide list to include user-selectable program identifiers of any other kind (e.g., shortcuts to web sites, computer programs, and the like) which implement the corresponding program when selected.

SUMMARY OF THE INVENTION

The present inventor recognizes that an EPG is becoming the preferred way for program navigation in entertainment systems. The present inventor also recognizes that more and more people are spent more and more time in front of such entertainment systems everyday. It is, therefore, desirable to integrate calendaring or scheduling function into an EPG. In other words, it would be desirable, for example, to allow a user to enter a reminder in the EPG, such as "call Mom", "Wife's birthday" or "pay bill" in a time period specified by a user as part of the EPG display. This is especially advantageous since a typical EPG is already being displayed in a time grid format.

A primary object of the present invention is to overcome at least one of the aforementioned problems by providing a user with customizing capabilities so that the user's EPG may be customized to include user-specific programs or items in addition to those which are distributed generically.

To achieve this and other objects of the present invention provides a method of customizing a program guide. The method comprises the steps of: (a) storing program guide information into an electronic host device, the program guide information including program identifiers, each of which designates one of a plurality of programs; (b) generating a menu by displaying at least some of the program identifiers on a display device associated with the electronic host device, the program identifiers being selectable by a user to implement respective ones of the programs; and (c) customizing the menu to include at least one additional identifier which is not from said program guide information.

The present invention also provides an electronically generated interface for displaying and customizing a program guide. The interface comprises program guide information, a menu, and an interface device. The program guide information is stored in an electronic host device and includes program identifiers, each of which designates one of a plurality of programs. The menu includes at least some of the program identifiers on a display device associated with the electronic host device. The program identifiers are selectable by a user to implement respective ones of the programs. The input device is adapted to communicate with the electronic host device to customize the menu so that the menu further includes at least one additional identifier.

The above and other objects and advantages will become more readily apparent when reference is made to the following description taken in conjunction with the accompanying drawings.

BRIEF DESCRIPTION OF THE DRAWINGS

In the drawings:

FIG. 6 shows an exemplary customized menu according to a preferred implementation of the present invention.

DETAILED DESCRIPTION

Figure 1:
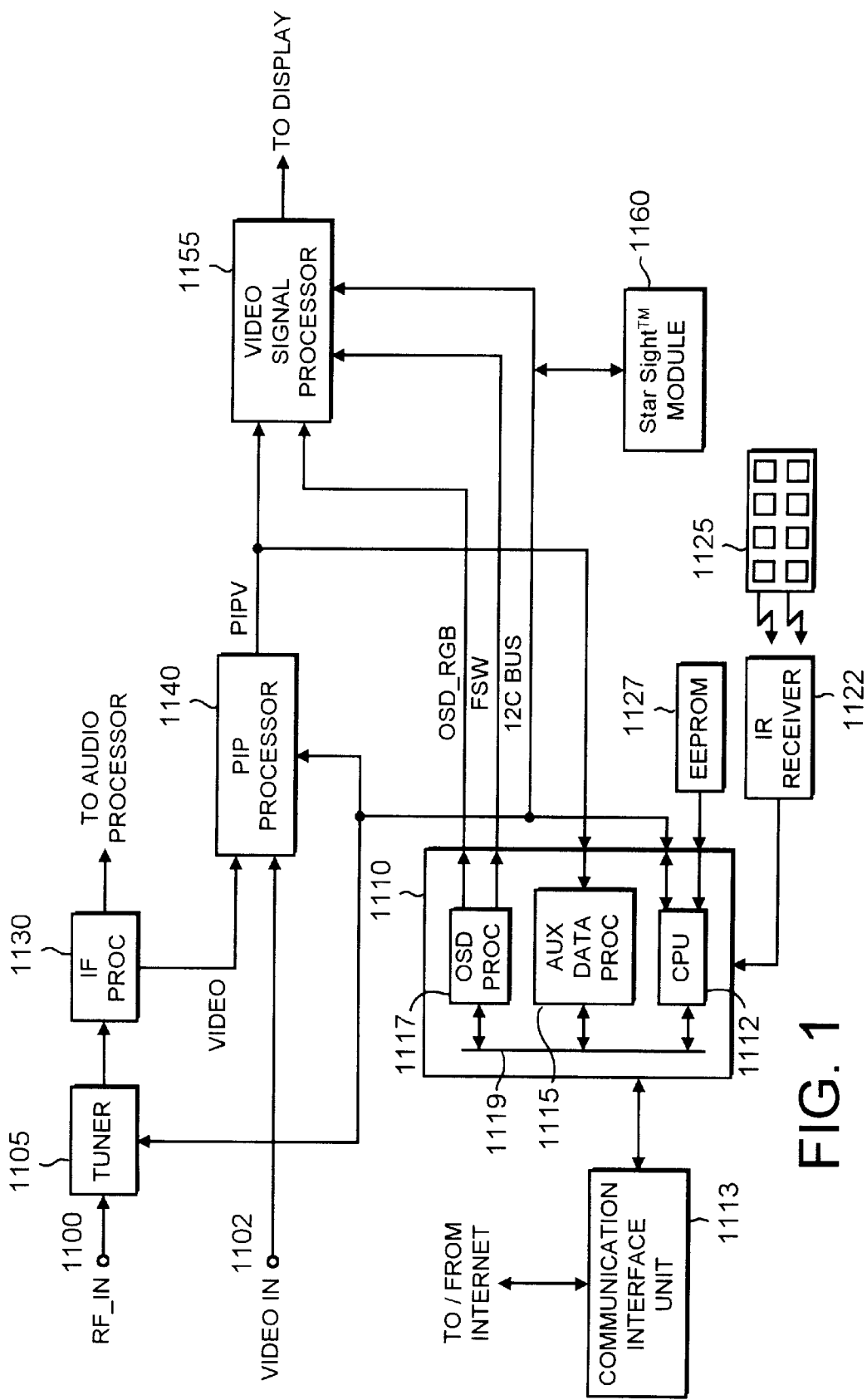
FIG. 1 shows an example of a television system suitable for processing and customizing program guide information in accordance with the present invention.

FIG. 1 shows an example of a television system suitable for processing and customizing program guide information in accordance with the present invention. The television receiver shown in FIG. 1 is capable of processing both analog NTSC television signals and Internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning, and demodulating a particular television signal that is included in signal RF_IN. IF processor 1130 produces baseband video signal VIDEO representing the video program portion of the tuned television signal. IF processor 1130 also produces a baseband audio signal that is coupled to an audio. processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor ($\mu$P) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within $\mu$P1110 executes control programs contained within memory, such as EEPROM 1127 shown in FIG. 1, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Other examples of control programs stored in EEPROM 1127 are software for implementing the operations shown in FIG. 3 in accordance with the present invention as to be described below.

Main microprocessor 1110 also controls the operation of a communications interface unit 1113 for providing the capability to upload and download information to and from the Internet.

Communication interface unit 1113 includes, for example, a modem for connecting to an Internet service provider, e.g., via a telephone line or via a cable television line. The communication capability allows the system shown in FIG. 1 to provide e-mail capability and Internet related features such as web browsing in addition to receiving television programming.

CPU 1112 controls functions included within $\mu$P1110 via bus 1119 within $\mu$P1110. In particular, CPU 1112 controls auxiliary data processor 1115 and on-screen display (OSD) processor 1117. Auxiliary data processor 1115 extracts auxiliary data such as StarSight® data from video signal PIPV.

StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 a.m.). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 1125), CPU 1112 transfers formatted StarSight® EPG display data from StarSight® module 1160 via I²C BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

For an EPG display, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes a control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The processing and displaying of a program guide in accordance with the present invention may be implemented using a combination of software and hardware. For example, referring to FIG. 1, display of an EPG may be implemented by software in memory such as EEPROM 1127. Activation of an EPG, e.g., by a user pressing an EPG related button on remote control 1125, causes CPU 1112 to execute the EPG software routine. As part of generating an EPG display, CPU 1112 also accesses EPG data and graphics that may be stored in StarSight module 1160 via the I2C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 1 that have been described thus far comprises an ST9296 microprocessor produced by SGS-Thomson Microelectronics for providing the features associated with μP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 2:
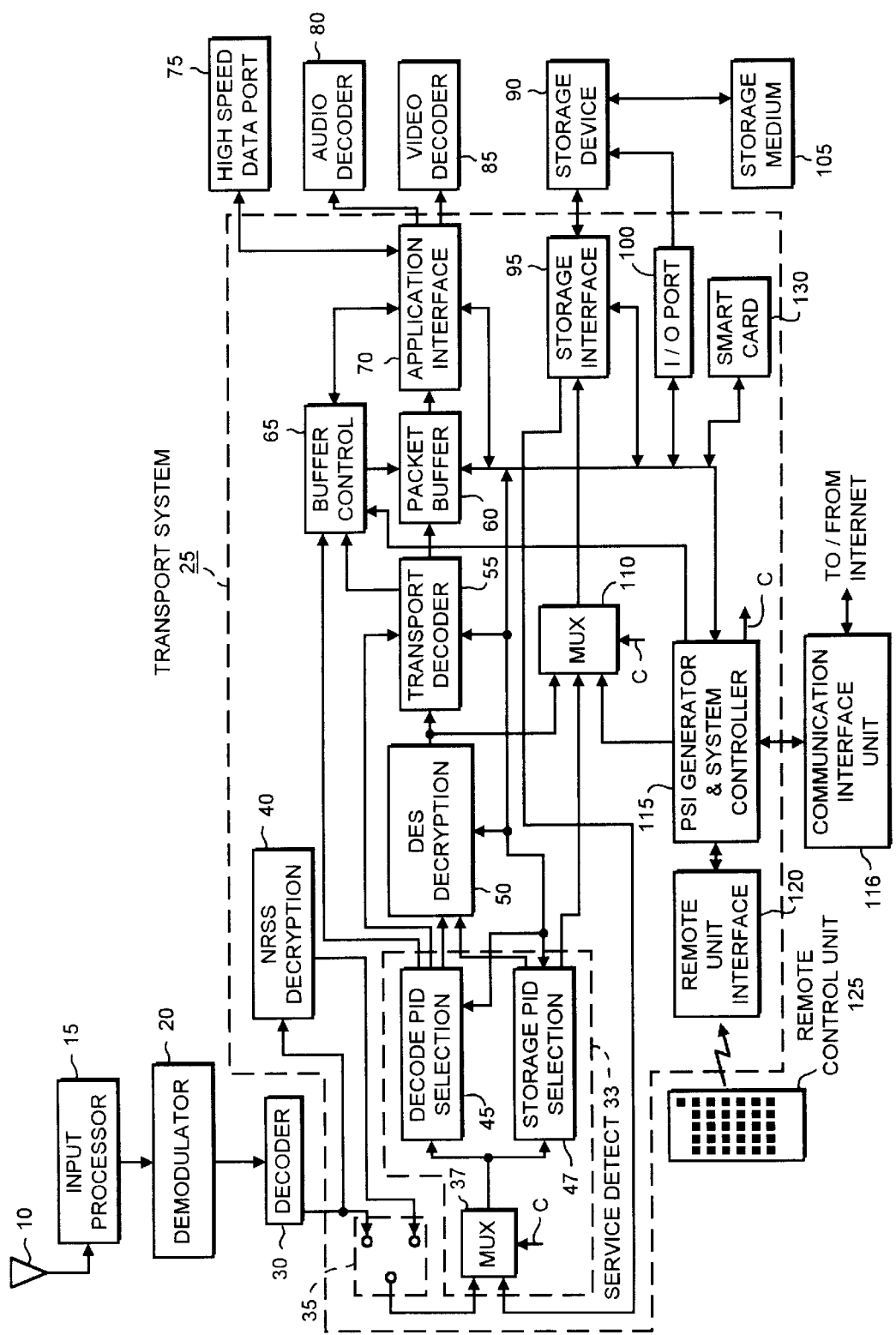
FIG. 2 shows an example of a digital video processing apparatus suitable for processing and customizing program guide information in accordance with the present invention.

FIG. 2 shows another example of an electronic device capable of processing and customizing program guide information in accordance with the present invention. As described below, the system shown in FIG. 2 is an MPEG compatible system for receiving MPEG encoded transport streams representing broadcast programs. However, the system shown in FIG. 2 is exemplary only. User interface systems are also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, Internet data, audio presentations (e.g., from a remote source or from a local source, such as a compact disk or other audio medium), visual presentations, audiovisual presentations (e.g., from a remote source or a local source, such as a compact disk or other audio medium), or other communications, for example.

In overview, in the video receiver system of FIG. 2, a carrier modulated with video data is received by antenna 10 and processed by input processor unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 2 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). For example, a program content such as audio and video information for a particular channel may be identified by one PID, while packet containing program guide information may be identified by another PID. The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information. As discussed above, the program description may comprise different program descriptive fields such as title, star, rating, etc., relating to a program.

The user interface incorporated in the video receiver shown in FIG. 2 enables a user to activate various features by selecting a desired feature from an on-screen display (OSD) menu. The OSD menu may include an electronic program guide (EPG) as described above and other features discussed below. Data representing information displayed in the OSD menu is generated by system controller 115 in response to stored program guide information, stored graphics information, and/or program guide and graphics information received via the input signal (e.g., StarSight data) as described above and in accordance with an exemplary control program to be shown in FIG. 3 and to be described below. The software control program may be stored, for example, in embedded memory (not shown) of system controller 115.

Using remote control unit 125 (or other selection means such as a mouse) a user can select from the OSD menu items such as a program to be viewed, a program to be stored, the type of storage media and manner of storage. System controller 115 uses the selection information, provided via remote unit interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. This approach places all security related functions in one removable unit that easily can be replaced if a service provider decides to change encryption technique or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input datastream and/or pre-stored on the insertable smart card itself (International Standards Organization document ISO 7816-3 of 1989 defines the interface and signal structures for a smart card system).

The packets provided by units 45 and 47 to unit 50 are encrypted using encryption techniques such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 1. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 2 to provide e-mail capability and Internet related features such as web browsing in addition to receiving television programming.

Figure 3:
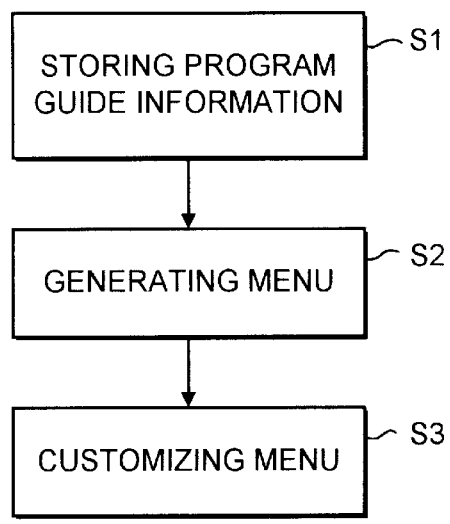
FIG. 3 is a flow chart of a method of customizing program guide information in accordance with a preferred implementation of the present invention.

FIG. 3 is a high-level flow chart of an exemplary control program which, according to the present invention, may be executed by controller 1110 of FIG. 1, controller 115 of FIG. 2, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., video tape recorders), satellite television and/or data signal converters, program guide receiver units, and the like, regardless of whether incorporated into a television receiver or personal computer or connected externally thereto. It will be appreciated that the process embodied in the exemplary control program may be implemented in hardware, software, or a combination thereof.

The exemplary control program as shown in FIG. 3, when executed, facilitates display and customization of a program guide. A person skilled in the art would readily recognize from the flow chart and the following description that the control program when executed by any one of the systems described in FIGS. 1 and 2 or by any other suitably programmed electronic host device will provide substantially the same features and advantages in accordance with the present invention. Therefore, to avoid redundancy, the control program will be described below only with respect to the exemplary hardware implementation shown in FIG. 2.

According to the exemplary program, controller 115 of FIG. 2 initially executes the step S1 of storing program guide information received from a program guide database provider as described above in connection with FIG. 2.

The program guide information received preferably is generic to the extent that other subscribers receive the same or similar program guide information. This generic program guide information is downloaded using one of a plurality of known distribution protocols, as described above.

Included with the program guide information are program identifiers. Each of the program identifiers designates one of a plurality of programs which can be implemented (e.g., displayed, audibly broadcast, or executed) by the electronic host device itself or which can be implemented by a display device, audio equipment or a computer associated with the electronic host device.

As shown in FIG. 3, application interface 70 under the control of the controller 115, generates a menu (Step S2) by displaying at least some of the program identifiers on a display device (not shown) associated with the electronic host device. Part of the function of the application interface 70 is to process OSD information corresponding to an EPG that is generated by the controller 115. Preferably, this EPG menu is generated in response to the EPG display being activated (e.g., a user activating a particular key on remote control 125). In response to such activation, the controller 115 transfers EPG display data to application interface 70. Application interface 70 then outputs the corresponding display information to the video decoder for displaying on a display device (not shown).

Figure 4:
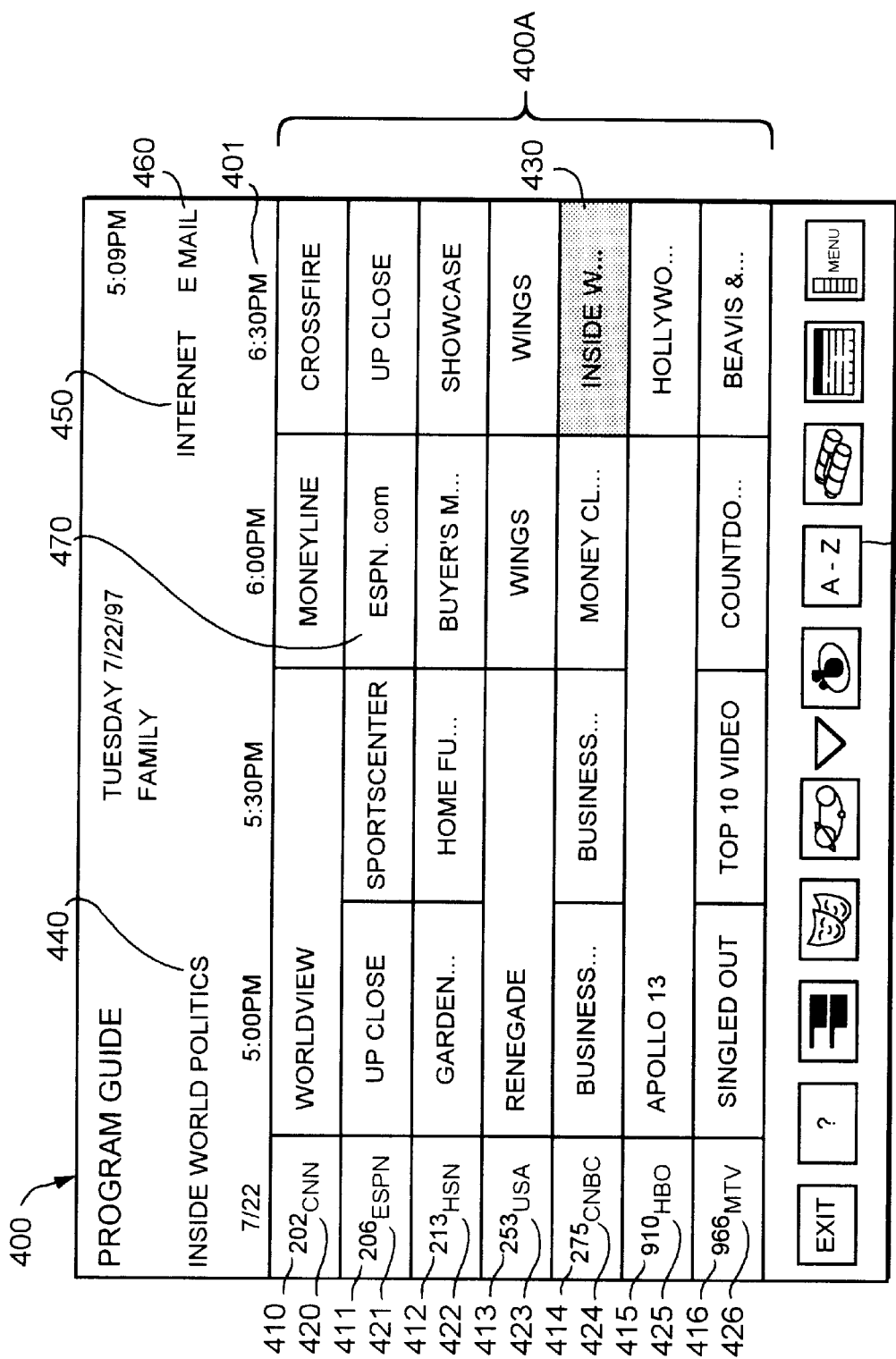
FIG. 4 shows an exemplary EPG menu according to a preferred embodiment of the present invention.

An exemplary EPG menu 400 is shown in FIG. 4. The menu 400 includes a "grid guide" 400A which shows a program schedule in a time-and-channel format, similar to a TV schedule listed in a newspaper. One dimension (e.g., the horizontal dimension) of the "grid guide" 400A shows the time information 401, while the other dimension (e.g., the vertical dimension) of the "grid guide" 400A shows channel information. When an abbreviated element 430 of the "grid guide" is highlighted or a cursor is located thereon, as will be described hereinafter, the truncated parts of the abbreviated element 430 appear in a "highlighted text" field 440 of the menu 400.

In the menu 400, each of the program identifiers (e.g., channel numbers 410–416, channel station names 420–426, web-site identifier 470, Internet identifier 450, e-mail identifier 460, or the like) is selectable by a user to implement respective ones of the programs. In particular, the controller 115 monitors the location of a position indicator, such as a cursor and/or highlighting, on the EPG menu display. A user controls the location of the position indicator using direction and selection keys of remote control 125 as described above. Alternatively, the system could include a mouse device or an appropriate pointer device.

Controller 115 detects activation of a selection device, such as clicking a key on remote control device 125 or clicking on a mouse button, and evaluates current cursor/highlighting location information in conjunction with EPG menu data being displayed to determine the function desired (e.g., implementing a particular program). If such activation of the selection device is performed while the cursor and/or highlighting is located on one of the program identifiers, the controller 115 determines that the corresponding program is to be implemented (i.e., displayed, audibly broadcast, and/or executed). Controller 115 subsequently activates the control and/or display action associated with the selected program.

If, for example, the selected program identifier represents a web-site, the controller 115 implements a web-browsing program and accesses the corresponding web-site. When the selected program identifier is associated with an audio program, video program, or audiovisual program, the controller 1110 responds by tuning the electronic host device or an associated receiver to the appropriate channel and by displaying and/or audibly broadcasting that program. Highlighting of such programs and subsequent selection of other function icons on the menu 400 can implement automatic tuning at a later time to the selected program or automatic recording thereof by the electronic host device or by another device connected to the electronic host device.

Selection of the "Internet" identifier 450 causes the controller 1110 to implement a web-browsing program through an Internet service provider, while selection of the "e-mail" identifier 460 causes the controller 450 to implement an e-mail transmission and/or reception program through the same or a different Internet service provider.

While the system and method provided by steps S1 and S2 in FIG. 3 and by the menu 400 in FIG. 4 achieve a generally effective and convenient EPG arrangement, the resulting arrangement is limited to the generic program information provided by the EPG distributor. It provides no way of customizing the menu to include program identifiers associated with any of the subscriber's own local sources of programming.

The subscriber, for example, may have a collection of audiovisual or visual information from a camcorder, a CD-based collection of audio presentations (e.g., music), a collection of video programs on optical disk, magnetic tape, and the like, and/or a collection of computer programs, all of which can be implemented locally by the electronic host device or devices connected thereto. The subscriber also may have access to additional programming through remote sources, such as alternative Internet service providers, satellite service providers, and the like. It would be convenient to incorporate program identifiers associated with such user-specific sources into the EPG menu, so that the user can simply select such program identifiers from the menu to implement the corresponding program in a manner similar to the selection and implementation of the programs which are included in the generic program guide information.

Also, as discussed above, it is desirable to be able to integrate the ability to have personalized calendaring or scheduling function as a part of the EPG, since a large amount of time is now spent looking at an EPG.

As shown in FIG. 3, the exemplary method of the present invention therefore includes the additional step S3 of customizing the menu to include at least one additional identifier. The identifier may identifies a program which is selectable by a user (e.g., an audio presentation from a collection of such presentations on one or more forms of locally maintained audio media), or a reminder item (e.g., items of things to do). The customization preferably is performed locally by the user of the electronic host device. The locally performed customization can be performed using a keyboard or other input device dedicated to such customization, or alternatively, can be performed, as will be described hereinafter, using hardware which is also used in performing functions of the electronic host device other than customization.

Preferably, the step of customizing is performed interactively. That is, the user communicates to the electronic host device (e.g., by pressing a "customization" button on remote control 125 or on the electronic host device) a desire to customize the menu, and the electronic host device then responds by generating a customization display which enables and/or prompts the user to enter program guide information pertaining to the additional user-specific program(s) which the user wishes to incorporate into the menu.

Figure 5:
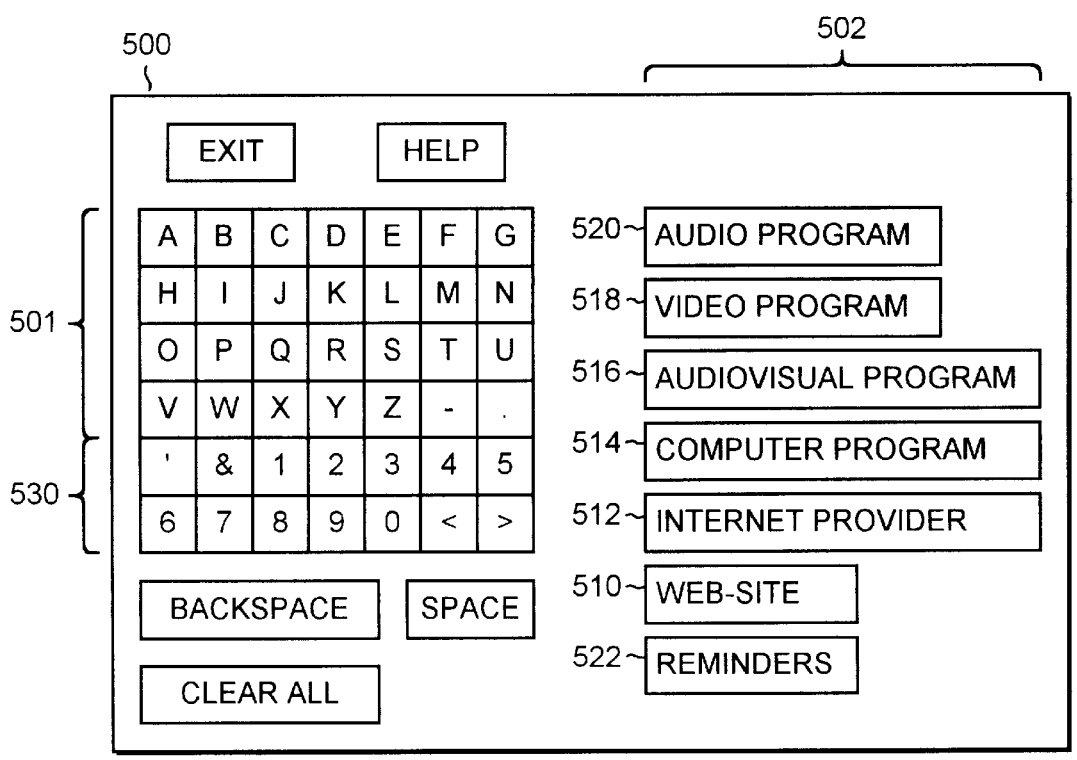
FIG. 5 shows a customization display according to a preferred implementation of the present invention.

An exemplary customization display 500 is shown in FIG. 5. The exemplary customization display 500 preferably includes a display 501 of every letter in the alphabet (i.e., a virtual keyboard), each of which can be selected using the remote control unit 125, a mouse or the like.

Also included is a field 502 of program type indicators 510–522. The program type indicators 510–522 are user-selectable to inform the electronic host device of the type of program or item which is being incorporated into the menu 400. When one of the program type indicators 510–522 is selected from the customization display, the controller 115 responds by prompting the user to enter program or item specific information pertaining to the additional program or item which is to be incorporated into the menu.

The program or item specific information can include, for example, the characteristic information described above, namely, program title, program theme, program category, program keywords, program description, program type, program length, program starting time, program ending time, repeat frequency, or combinations thereof. The program description itself may include, for example, stars, director, parental rating, a short summary of the content of a program, and/or the like. The program-specific information also may include an input/output port designation. The input/output port designation indicates to the controller 115 where the source of the additional program will be connected to the electronic host device. Examples of such input/output ports are computer local ports, computer communication ports, jacks for audio, video, and/or audiovisual devices, and the like.

Figure 5A:
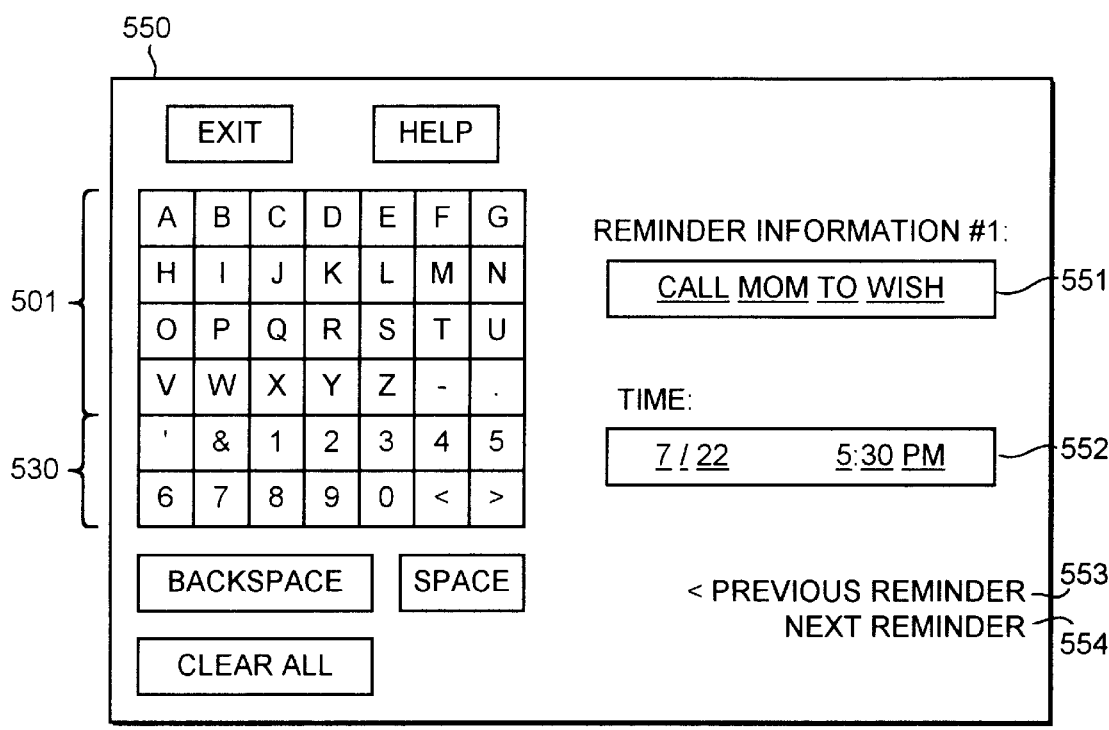
FIG. 5A shows another customization display.

In addition, program specific-information for program type indicator of "REMINDERS" 522 comprises information about a reminder item to be entered by a user, such as, for example, "call Mom"; "do homework"; or "daughter's birthday", etc., as shown in FIG. 5A. In addition, the user may be prompted to enter a time slot associated with the entered item, to be described below.

The user enters the program or item specific information by successively selecting the letters from the alphabetic display.

Alternatively, the program or item specific information can be entered by selecting one of a plurality of predetermined choices which are presented to the user by the controller 115 as the controller 115 prompts the user to enter each item of program or item specific information.

One example of the predetermined choices involves selection of the input/output ports. Since the electronic host device typically is configured with only a certain number of such ports and with only certain types of ports, the controller 115 can be easily programmed to display indicators associated with each of such ports, and preferably of only those ports which are available for selection by the user during entry of the program-specific information. This way, the user need not memorize all of the types of ports and the number of available ports. Preferably, the controller 1110 determines which choices are available based on which ports are compatible with the type of program being incorporated into the menu 400, and displays as the user-selectable choices only those ports which are compatible.

In another aspect of the present invention, when a user selects "REMINDER" program type indicator 522, an exemplary customization display 550 for entering item specific information for an electronic scheduling function will appear as shown in FIG. 5A. The user may then enter a to-do item in field 551 using, for example, the virtual keyboards 501 and 530. In addition, the user may specify a time period for which this reminder item should appear on the EPG by entering the time and date information in field 552. The user can provide or edit information for additional reminder items by selecting the previous or next reminder keys 553 and 554.

Once the program or item specific information has been entered, the controller 1110 updates the program guide information to include the program or item specific information, including an additional identifier indicative of the added program or reminder item. Preferably, this update occurs only after the user has entered an appropriate "save" command (e.g., via the remote control 125 and/or selection of an appropriate "save" item on the menu 400) to verify that the program or item specific information is correct and that the additional identifier is to appear in the menu 400.

The next time the menu 400 is displayed, the controller 115 incorporates the additional identifier into the menu 400 at an appropriate location. The location of the additional identifier in the menu 400 preferably is determined according to the characteristic information which was entered by the user for that particular program. In addition, any alphabetizing of titles (e.g., by pressing "A–Z" indicator 480), sorting by theme, by category, or by type of programming, sorting by title (as opposed to channel), keyword searches, simplified recording commands (e.g., one-touch recording), and/or other search and analysis techniques, which the controller 115 was able to perform on the generic program guide information also can be performed by the controller 115 on the combination of the generic program guide information and the program guide information which was added to the menu 400 through customization. As an example, FIG. 6 shows that the reminder item "CALL MOM" which has been entered as described above, now appears on the bottom of a customized EPG menu 600, at the entered time slot of 5:30 p.m. This information appears on the "Reminder" cell 428, as part of the EPG 400A.

In this regard, the controller 115 preferably treats the user specified program guide information in substantially the same way as it treats the generic program guide information. Such treatment extends into the functions carried out by selection of the various icons which appear across the bottom of the menus in FIGS. 4, 6, 7 and 7A.

For example, with regard to keyword searching, the controller 115 preferably is programmed to respond to a keyword search command from a user. Such a command can be provided by selecting a corresponding one of the icons along the bottom of the menus in FIGS. 4, 6, 7 or 7A. The controller 115 preferably is programmed to respond to such a command by prompting the user to enter a string of letters representing the keyword(s). The keyword(s) can be entered using the remote control 125, a suitable display screen with or without a virtual keyboard, and/or the like. The keyword (s) typically will be a word(s) or term(s) which the user believes to be present in the characteristic information of a desired one of the programs or added programs represented by the customized program guide information. The controller 115 responds to entry of the keywords by searching the characteristic information for occurrences of (or matches with) the keyword(s). The controller 115 then modifies the menu (e.g., menu 400) to display those of the program or item identifiers and the additional program or item identifier(s) which have matching terms in the characteristic information associated therewith.

Another example of a customization sequence involves customizing the menu 400 to include an identifier indicative of a compact disk collection. In particular, the user commences the customization sequence by appropriately communicating to the electronic host device (e.g., via the remote control 125) the user's intention to effect customization of the menu 400.

The controller 115 responds by generating the customization menu 500 shown in FIG. 5. Once the customization menu 500 has been displayed, the user selects the "audio" program type indicator 520, thereby communicating to the controller 115 that an audio program is to be added to the menu 400. The controller 115, in response, generates one or more display fields (either simultaneously or sequentially) prompting the user to enter the program-specific information. The program-specific information can include, for example, information indicative of which audio jacks will be connected to the CD player, titles of some or all of the CDs in the collection, names of artist(s) on each of the CDs, titles of songs or tracks on the CDs, categories of content (e.g., music, drama, and the like), sub-categories of content (easy listening music, rock-and-roll music, classical music, and the like), keywords associated with each CD and its individual tracks, or combinations thereof.

Alternatively, the designation of audio jacks can be performed, as indicated above, and the controller 115 can be programmed to respond to such a designation by reading some or all of the program-specific information other than the audio jack designation from the CDs in the CD player or from the CD player itself. Regardless of the particular technique which is used to enter the program-specific information, the controller 115 responds by customizing the menu 400 accordingly.

Customized menu 600, in addition to including the program identifiers associated with the generic programming, also includes a program identifier 601 indicative of the compact disk collection. The added program identifier 601 may include a simple description of the additional program (as shown), or alternatively, a graphical representation of the additional program (e.g., an icon that looks like a compact disk). A combination of a description and a graphical representation can be provided as yet another alternative.

Depending on the program-specific information or desired operation of the electronic host device, the controller 600 can be programmed to respond to selection of the added program identifier 601 by either starting to play a particular one of the tracks on a particular one of the CDs or by generating a sub-menu of some or all of the program-specific information associated with the CD collections.

The sub-menu can be provided as part of the customized menu 600, or alternatively, in place thereof. Several layers of submenus also can be provided, for example, based on a hierarchy of the program-specific information. At a first level in the hierarchy of sub-menus, the display can present choices among categories of programs, such as musical CDs versus dramatic CDs. Selection of one of the categories by the user then causes the controller 115 to display, for example, titles of the programs within the selected category. It will be appreciated from the present application that numerous combinations of sub-menus and hierarchical configurations can be implemented in accordance with the present invention.

In another aspect of the invention, FIG. 6 also shows that there is now an identifier "REMINDER" being displayed in cell 428 as described above. Cell 429 shows that there is a reminder item 429 that has already been entered by a user previously. To find out more information about this reminder item or to perform further editing on this item, the user may simply select cell 429 using the remote entry device 125. Once this cell is selected, customization display 550, for example, will be shown. This allows the user to see the full text of the reminder item which is not shown in the grid guide of 600 in FIG. 6, due to space limitation of cell 429. The user may also edit the reminder item, as described above in connection with FIG. 5A.

Figure 7:
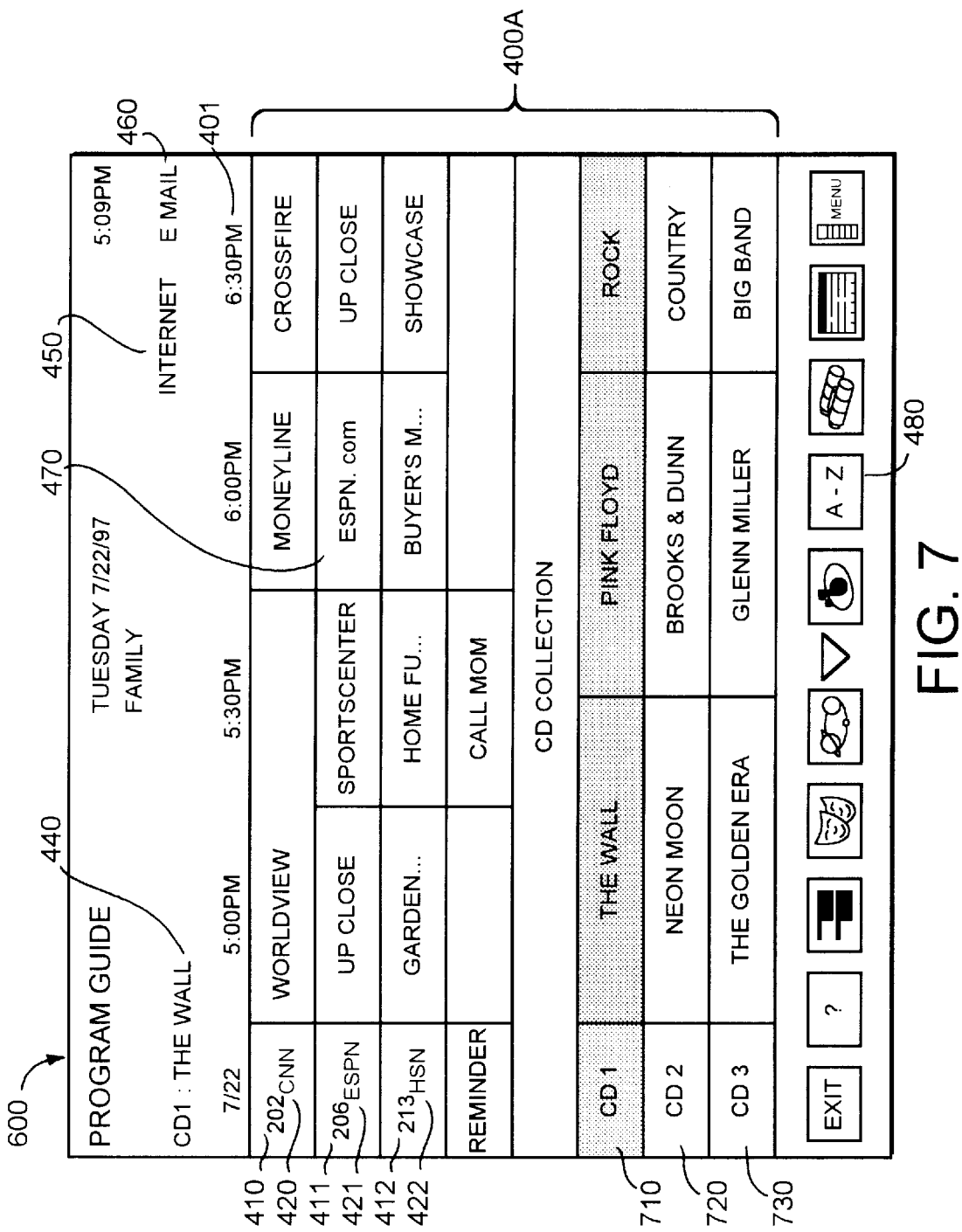
FIG. 7 shows an exemplary sub-menu according to a preferred implementation of the present invention.

FIG. 7 shows an exemplary sub-menu 700 which can be provided while maintaining certain parts (e.g., the top three lines of the "grid guide" 400A) of the customized menu 600. The exemplary sub-menu 700 includes program identifiers 710, 720, and 730 indicative of respective musical works. Following each program identifier 710, 720, and 730 is the title of the musical work, the artist, and a description of the musical work.

The controller 115 is programmed by virtue of the customization process and appropriate software and/or hardware, to commence in response to a user's selection of one of the program identifiers 710, 720 or 730, audible broadcasting of the selected musical work (e.g., "The Wall" by Pink Floyd) through an appropriate speaker incorporated in or connected to the electronic host device.

The controller 115 also may be programmed to permit editing or deletion of any of the program guide information being displayed, or alternatively, editing or deletion of only the added program guide information displayed. In this regard, the customization display 500 or sub-menus associated therewith can be provided with user-selectable "edit" or "delete" items (not shown) which, when selected, implement an editing or deletion process. Preferably, the controller 115 is programmed so that, during the editing or deletion process, the user selects the item(s) of program guide information to be edited or deleted using the remote control 125 or otherwise, and the controller 115 responds by displaying the selected program guide information in a user-editable or user-deletable manner on the customization display 500. After editing or deletion, the editing or deletion process can be finalized by selection of a "save" item (not shown) on the customization display 500.

Figure 8:
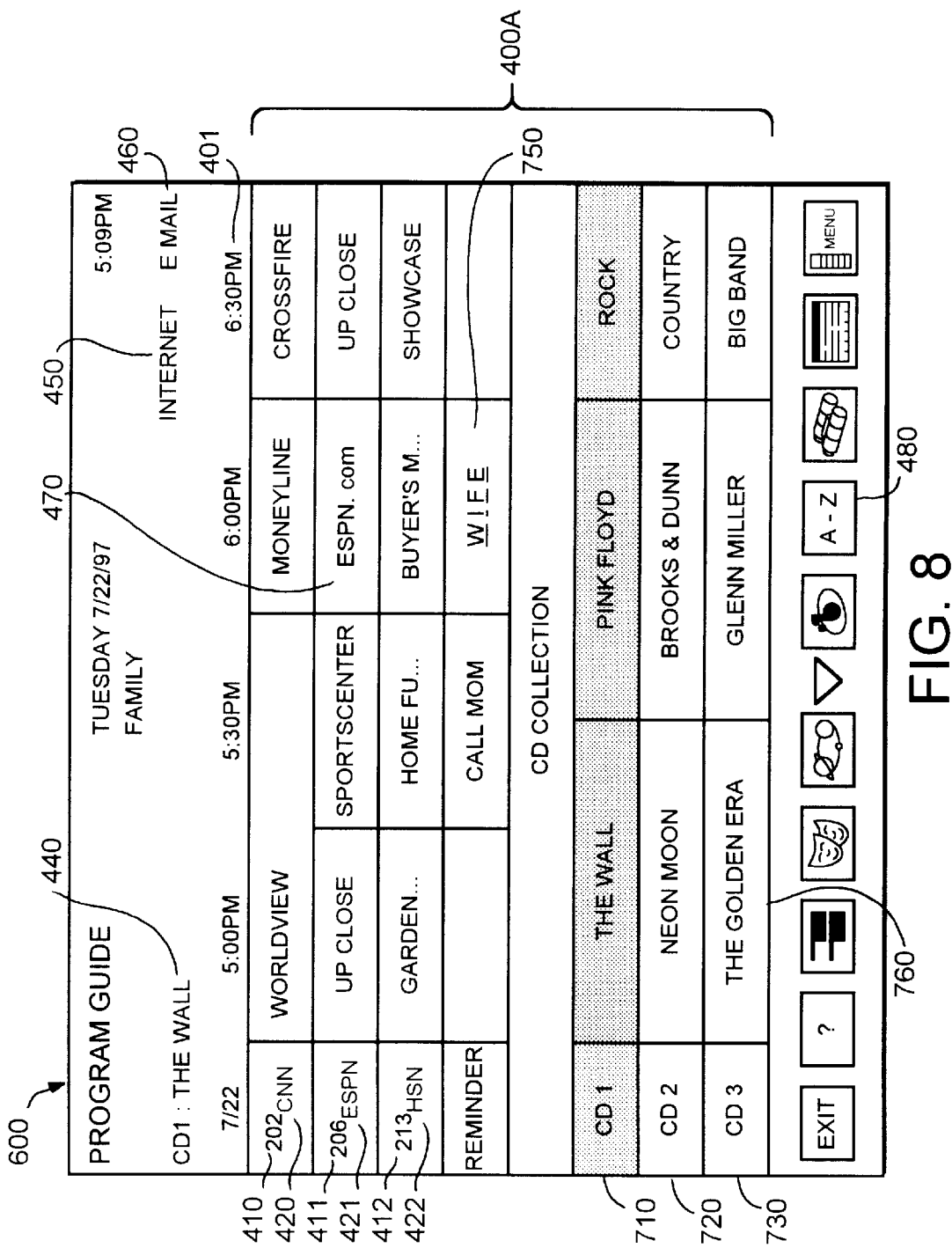
FIG. 8 shows another exemplary customization display according to a preferred implementation of the present invention.

In addition, FIG. 8 shows another preferred embodiment of the present invention for customizing an EPG. FIG. 8 shows a preferred embodiment of an EPG in which the text in a selected cell of the EPG may be edited. For example, a user may select cell 750 via user entry device 125. Once the cell 750 is highlighted, the user may further select an edit text mode via, for example, a key on the user entry device 125. Once this mode is selected, a user is then able to enter a desired text such as "WIFE'S BIRTHDAY", using any one of the possible user entry methods as described above. Similarly, a user may change the existing text of a select cell 760 and change the name of the song "THE GOLDEN ERA" to, for example, "THE ERA." This capability provides a user an easy and fast way to customize an EPG directly.

According to the present invention, the programs which are represented by the program guide information can include, among other things, video presentations, audio presentations, audiovisual presentations, computer programs, web browsing programs, reminder items, and/or contents of a web site.

It is to be understood that the embodiments and variations shown and described herein are for illustrations only and that various modifications may be implemented by those skilled in the art without departing from the scope and spirit of the invention.

What is claimed is:

1. A method of customizing a program guide, said method comprising the steps of:

storing program guide information into an electronic host device, said program guide information including program identifiers, each of which designates one of a plurality of programs;

generating a menu by displaying at least some of said program identifiers on a display device associated with said electronic host device, said program identifiers being selectable by a user to implement respective ones of said programs; and customizing said menu to include at least one additional identifier which is selectable by a user to implement a function associated with said identifier, said function comprising a calendaring or scheduling reminder entered by said user unrelated to said programs.

2. The method of claim 1, wherein said step of storing program guide information is performed generically, whereas said step of customizing is performed interactively in response to user input.

3. The method of claim 1, wherein said plurality of programs include a combination selected from the group consisting of: video presentations, audio presentations, audiovisual presentations, computer programs, web browsing programs, and contents of a web site.

4. The method of claim 1, wherein said additional identifier identifies an additional program not originally identified in said program guide information.

5. The method of claim 1 wherein said additional identifier identifies a reminder item specified by said user.

6. The method of claim 4 wherein said function comprises implementing said additional program.

7. The method of claim 5 wherein said function comprises displaying said reminder item.

8. The method of claim 1, wherein said step of storing program guide information is performed using a distribution protocol, whereas said step of customizing is performed locally by said user.

9. The method of claim 8, wherein said distribution protocol includes transmission of the program guide information to the electronic host device via a modem associated with the electronic host device.

10. The method of claim 4, wherein said program guide information further includes characteristic information for each of said plurality of programs, and wherein said step of customizing said menu to include at least one additional identifier includes storing characteristic information at said electronic host device for each of said at least one additional program.

11. The method of claim 10, wherein said characteristic information includes information selected from the group consisting of: program title, program theme, program category, program keywords, program description, program type, program length, program starting time, program ending time, repeat frequency, and combinations thereof.

12. The method of claim 11, further comprising the step of sorting said program identifiers and said at least one additional identifier in said menu based on said characteristic information.

13. The method of claim 12, further comprising the steps of:

entering at least one term believed to be in the characteristic information of a desired program;

searching through said characteristic information to find matches with said at least one term; and modifying said menu to display those of said identifiers and said at least one additional program identifier which have matching terms in the characteristic information associated therewith.

14. The method of claim 4, wherein said at least one additional program includes at least one audio presentation from at least one local audio medium.

15. The method of claim 4, wherein said at least one additional program includes at least one audiovisual presentation from at least one local audiovisual medium.

16. The method of claim 4, wherein said at least one additional program includes at least one audiovisual presentation from a camcorder.

17. The method of claim 4, wherein said at least one additional program includes at least one audio presentation from at least one local audio medium, at least one audiovisual presentation from at least one local audiovisual medium, and at least one audiovisual presentation from a camcorder.

18. An electronically generated interface for displaying and customizing a program guide, said interface comprising:

program guide information stored in an electronic host device, said program guide information including program identifiers, each of which designates one of a plurality of programs;

a menu of at least some of said program identifiers on a display device associated with said electronic host device, said program identifiers being selectable by a user to implement respective ones of said programs; and an input device adapted to communicate with said electronic host device to customize said menu so that said menu further includes at least one additional identifier which is selectable by a user to implement a function associated with said additional identifier, said function comprising a calendaring or scheduling reminder entered by said user unrelated to said programs.

19. The interface of claim 18, wherein said additional identifier identifies an additional program not originally identified in said program guide information.

20. The interface of claim 18 wherein said additional identifier identifies a reminder item specified by said user.

21. The method of claim 19 wherein said function comprises implementing said additional program.

22. The method of claim 20 wherein said function comprises displaying said reminder item.

* * * * *